United States Patent
Ahn et al.

(10) Patent No.: US 10,857,772 B2
(45) Date of Patent: Dec. 8, 2020

(54) LAMINATING APPARATUS AND LAMINATING METHOD

(71) Applicant: Samsung Display Co., Ltd., Yongin-si (KR)

(72) Inventors: Sungsang Ahn, Yongin-si (KR); Taehyeog Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/597,638

(22) Filed: Oct. 9, 2019

(65) Prior Publication Data
US 2020/0039202 A1 Feb. 6, 2020

Related U.S. Application Data

(62) Division of application No. 15/348,720, filed on Nov. 10, 2016, now Pat. No. 10,457,028.

(30) Foreign Application Priority Data

Nov. 16, 2015 (KR) .................. 10-2015-0160450

(51) Int. Cl.
*B32B 37/00* (2006.01)
*B32B 37/12* (2006.01)
(Continued)

(52) U.S. Cl.
CPC ...... *B32B 37/0053* (2013.01); *B32B 37/1284* (2013.01); *B32B 38/1833* (2013.01);
(Continued)

(58) Field of Classification Search
CPC ......... B32B 3/02; B32B 3/28; B32B 2309/08; B32B 37/003; B32B 37/10;
(Continued)

(56) References Cited

U.S. PATENT DOCUMENTS

2013/0284351 A1 10/2013 Natarajan et al.
2014/0138009 A1* 5/2014 Lim .................... H01L 51/0097
156/60

(Continued)

FOREIGN PATENT DOCUMENTS

KR 10-2011-0125593 A 11/2011
KR 10-1271838 B1 6/2013
(Continued)

*Primary Examiner* — George R Koch
(74) *Attorney, Agent, or Firm* — Lewis Roca Rothgerber Christie LLP

(57) ABSTRACT

A laminating apparatus for laminating an adhesive film on a bent or curved cover window includes a rotation shaft extending in a first direction, a first frame configured to support the cover window, and including a first plate and a second plate facing each other to define an angle therebetween, and a curved connection portion between the first plate and the second plate, and a roller portion above the first frame, extending in the first direction, and configured to move in a second direction that is perpendicular to the first direction, wherein the first frame is configured to rotate with respect to the rotation shaft according to movement of the roller portion to bond the adhesive film to the cover window.

8 Claims, 10 Drawing Sheets

(51) Int. Cl.
  *B32B 38/18*    (2006.01)
  *B32B 41/00*    (2006.01)
(52) U.S. Cl.
  CPC ........ *B32B 41/00* (2013.01); *B32B 2307/412* (2013.01); *B32B 2457/20* (2013.01)
(58) Field of Classification Search
  CPC ............ B32B 38/1866; B32B 2457/20; B32B 2457/202; B32B 2457/206; B32B 2457/208; Y10T 428/24628; Y10T 156/1744; B29C 65/42; B29C 65/48
  USPC .................... 156/99, 580, 581, 583.3, 583.91
  See application file for complete search history.

(56) References Cited

U.S. PATENT DOCUMENTS

2015/0129138  A1     5/2015   Turner et al.
2016/0279915  A1*   9/2016   Uemura .............. B32B 37/0053

FOREIGN PATENT DOCUMENTS

| KR | 10-2014-0080238 A | 6/2014 |
| KR | 10-2014-0086712 A | 7/2014 |
| KR | 10-2015-0048547 A | 5/2015 |

\* cited by examiner

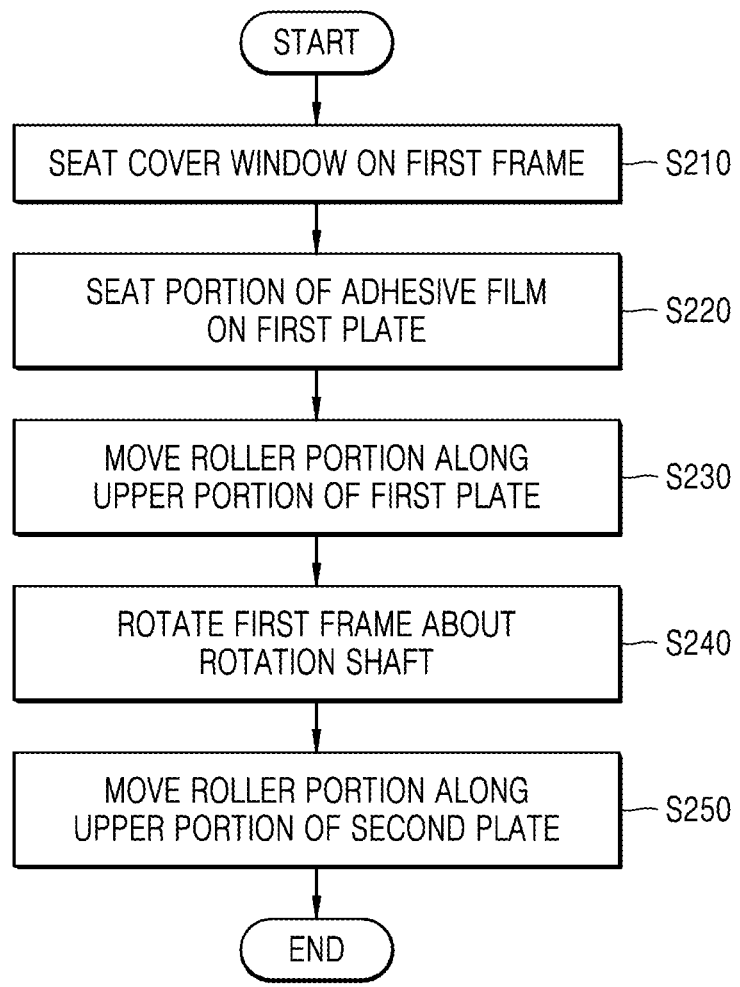

LAMINATING APPARATUS AND LAMINATING METHOD

CROSS-REFERENCE TO RELATED APPLICATIONS

This application is a divisional of U.S. patent application Ser. No. 15/348,720, filed Nov. 10, 2016, now U.S. Pat. No. 10,457,028 B2, which claims priority to, and the benefit of, Korean Patent Application No. 10-2015-0160450, filed on Nov. 16, 2015, in the Korean Intellectual Property Office, the disclosure of both of which is incorporated herein in its entirety by reference.

BACKGROUND

1. Field

One or more embodiments relate to a laminating apparatus and a laminating method capable of laminating an adhesive film onto a cover window for protecting a display module.

2. Description of the Related Art

Display apparatuses are configured to display a video signal, and include, for example, a television, a computer monitor, a personal digital assistant (PDA), a smart device, and the like, and also include any apparatus that displays a video signal that is input from the outside.

High definition flat plate-type display modules/display apparatuses, such as an organic light-emitting display panel, a liquid crystal display panel, a plasma display panel, and an electrophoretic display panel, are used.

Screens of the display apparatuses are typically exposed to the outside. In particular, a display apparatus having a touch function may be easily scratched or damaged by impact because a screen thereof has to be touched using a finger or a pen. Accordingly, to solve such a problem, a cover window (window cover) for protecting a screen of a display apparatus is attached to the display apparatus.

Although the cover window is positioned on the outermost side of the screen, there has recently been a problem that an appearance defect, such as a mark generated due to the pressing of a pen or a scratch, occurs in the cover window.

SUMMARY

One or more embodiments include a laminating apparatus and a laminating method, which are capable of laminating an adhesive film onto a cover window.

Additional aspects will be set forth in part in the description that follows and, in part, will be apparent from the description, or may be learned by practice of the presented embodiments.

According to one or more embodiments, a laminating apparatus for laminating an adhesive film on a bent or curved cover window includes a rotation shaft extending in a first direction, a first frame configured to support the cover window, and including a first plate and a second plate facing each other to define an angle therebetween, and a curved connection portion between the first plate and the second plate, and a roller portion above the first frame, extending in the first direction, and configured to move in a second direction that is perpendicular to the first direction, wherein the first frame is configured to rotate with respect to the rotation shaft according to movement of the roller portion to bond the adhesive film to the cover window.

The laminating apparatus may further include a second frame extending along the second direction, and including first and second guide portions spaced apart from each other, the first frame may be between the first and second guide portions, and the first and second guide portions may be configured to guide a moving direction of the roller portion.

The laminating apparatus may further include driver for generating a driving force for rotating the first frame about the rotation shaft.

The laminating apparatus may further include a displacement sensor configured to sense a moving displacement of the roller portion, and a controller configured to receive from the displacement sensor a displacement signal corresponding to the moving displacement, and configured to control driving of the driver.

When the roller portion faces the connection portion, the controller may be configured to transmit a driving signal for rotating the first frame about the rotation shaft to the driver.

The angle between the first plate and the second plate may be equal to, or greater than, about 0 degrees, and less than about 180 degrees.

The adhesive film may include a pressure sensitive adhesive.

The laminating apparatus may further include a plasma discharger attached to the roller portion.

A method of laminating an adhesive film on a curved or bent cover window by using a laminating apparatus includes seating the cover window on a first plate of a first frame, seating a portion of the adhesive film above the first plate of the first frame, moving a roller portion along an upper portion of the first plate, rotating the first frame about a rotation shaft, and moving the roller portion along an upper portion of a second plate of the first frame.

The method may further include sensing a moving displacement of the roller portion, generating a driving signal when the roller portion faces a connection portion of the first frame between the first plate and the second plate, and generating a driving force for rotating the first frame about the rotation shaft in response to the driving signal.

An angle between the first plate and the second plate may be equal to, or greater than, about 0 degrees, and less than about 180 degrees.

The method may further include guiding a moving direction of the roller portion by first and second guide portions that are spaced from each other, and that extend along a second direction that is perpendicular to a first direction along which the rotation shaft extends.

BRIEF DESCRIPTION OF THE DRAWINGS

These and/or other aspects will become apparent and more readily appreciated from the following description of the embodiments, taken in conjunction with the accompanying drawings in which:

FIG. 5 is a flowchart illustrating a method of laminating the cover window and the adhesive film using the laminating apparatus according to an embodiment.

DETAILED DESCRIPTION

Figure 1A:
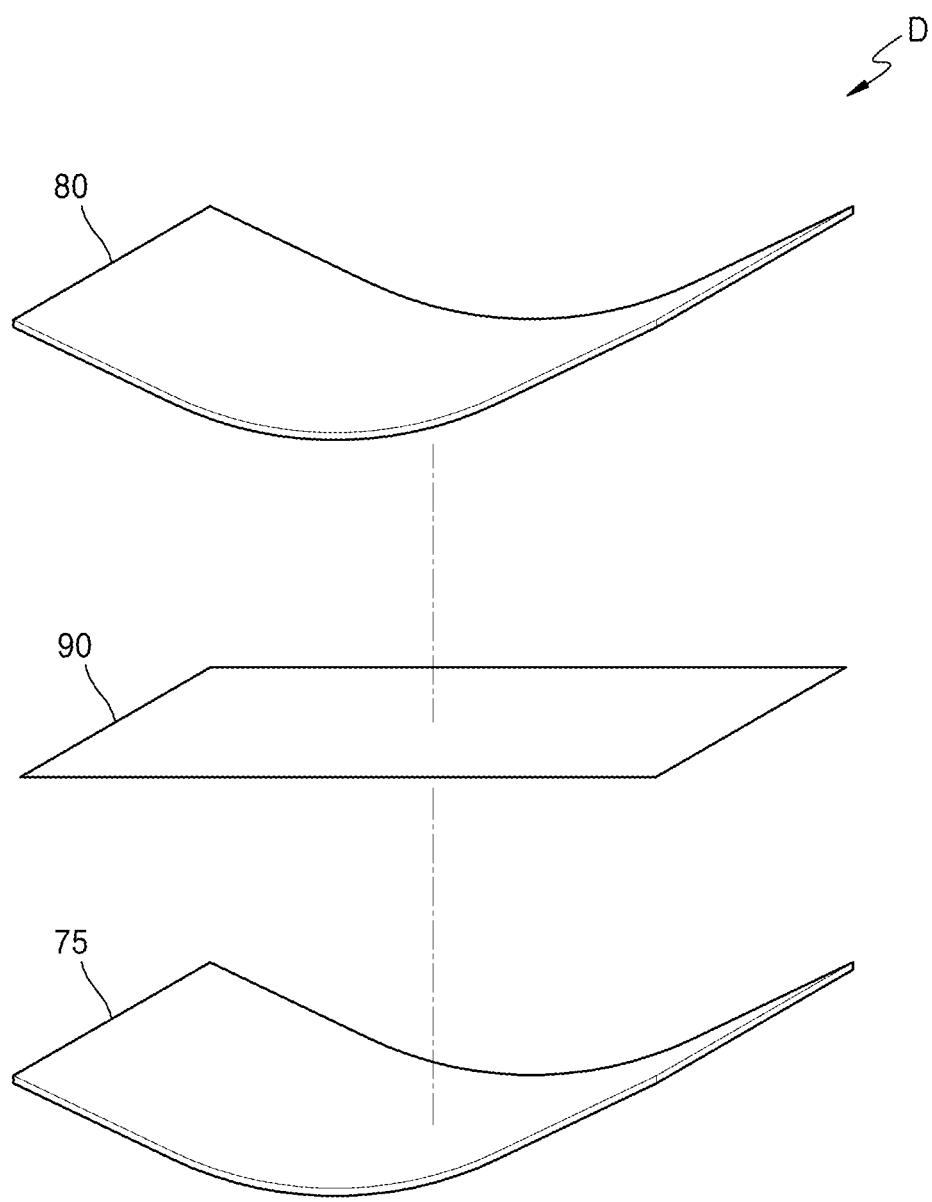
FIGS. 1A and 1B are schematic diagrams illustrating a display apparatus according to an embodiment.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
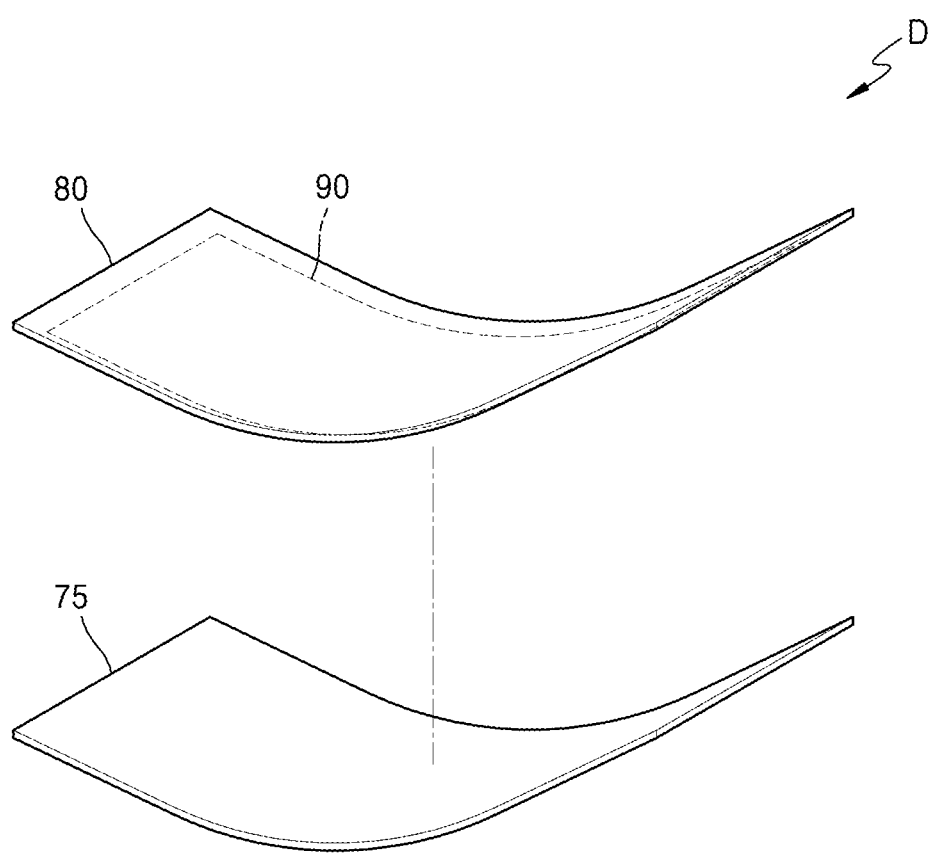
Figure 2:
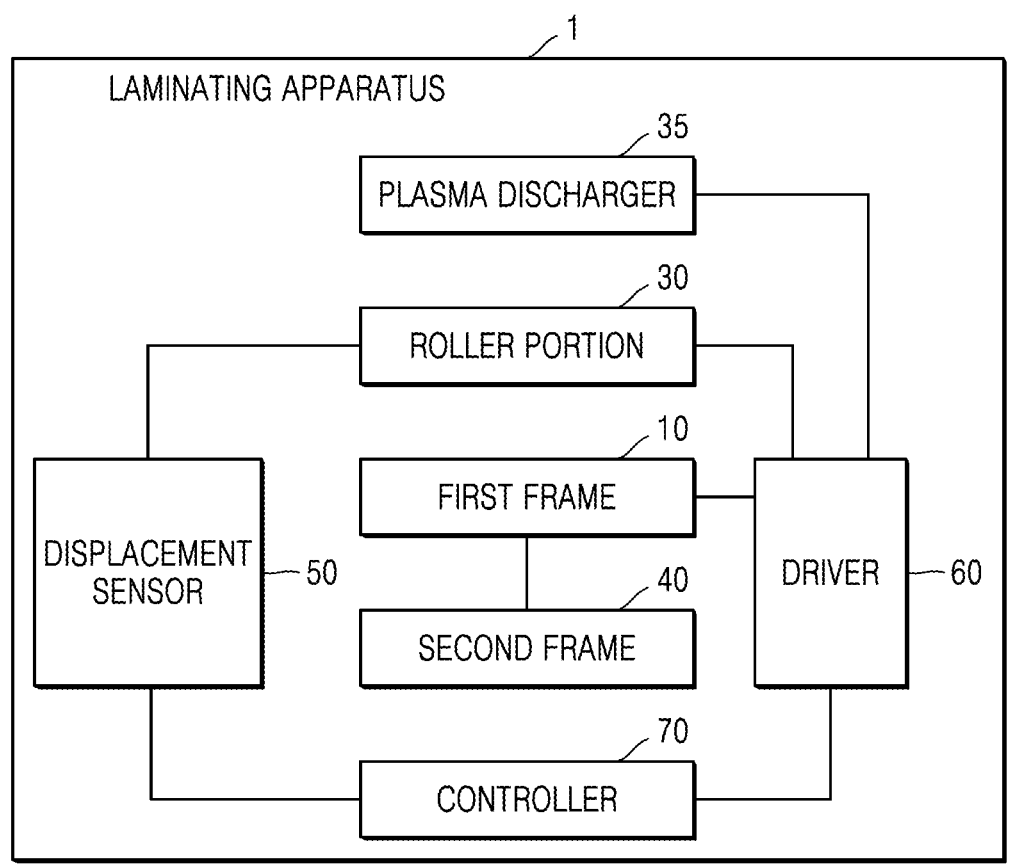
FIG. 2 is a schematic block diagram of a laminating apparatus according to an embodiment.
Figure 3A:
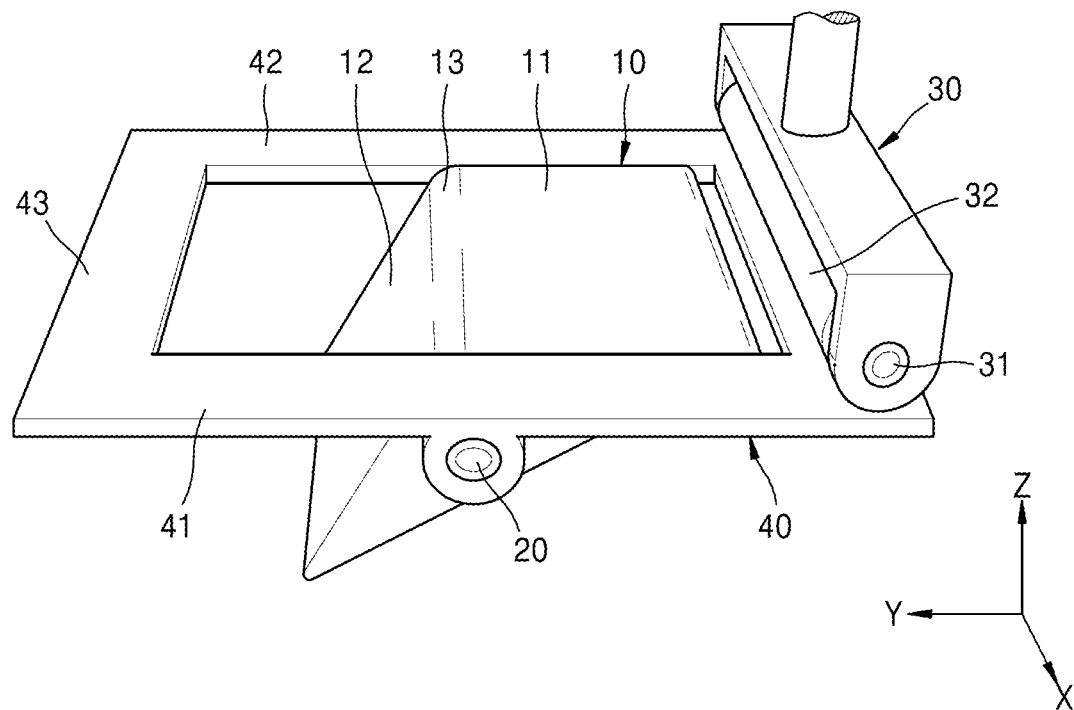
FIG. 3A is a schematic perspective view of the laminating apparatus according to an embodiment.
Figure 3B:
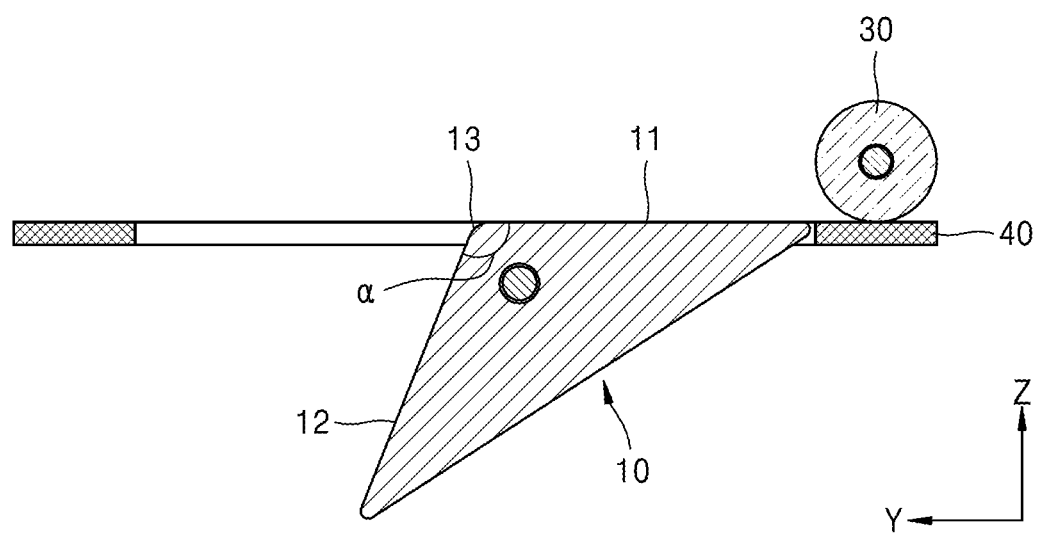
FIG. 3B is a cross-sectional view of the laminating apparatus illustrated in FIG. 3A.

FIGS. 1A and 1B are schematic diagrams illustrating a display apparatus according to an embodiment, FIG. 2 is a schematic block diagram of a laminating apparatus according to an embodiment, FIG. 3A is a schematic perspective view of the laminating apparatus according to an embodiment, and FIG. 3B is a cross-sectional view of the laminating apparatus illustrated in FIG. 3A.

Referring to FIG. 1A and FIG. 1B, a display apparatus D according to the present embodiment may include a display module 75, a cover window (e.g., a curved or bent cover window) 80 on the display module 75, and an adhesive film 90 between the display module 75 and the cover window 80. In general, the display module 75 is a structure in which a thin film transistor for realizing an image on a flexible substrate, a light-emitting element, a sealing layer, and the like are laminated. Because a flexible substrate is used instead of a rigid glass substrate, the display module 75 may be formed so that a portion of the substrate is bent or curved (e.g., to have a predetermined curvature) within a range in which the flexibility thereof is permitted.

The cover window 80, which is above the display module 75, may serve as a shielding unit for protecting the display module 75 from the outside, and may be formed of a transparent material. The cover window 80 according to the present embodiment may include a first plane 81 and a second plane 82 that face each other, and that may be separated by a predetermined interval, and may also include a curved portion 83 that connects the first plane 81 and the second plane 82 to each other (see FIG. 4A). Here, the curved portion 83 may have a shape of a bent portion having a curvature corresponding to the curvature of the display module 75 described above.

The adhesive film 90 is an adhesive layer that is between the display module 75 and the cover window 80, and serves to bond the display module 75 and the cover window 80 together. As an example, the adhesive film 90 may include fiber immersed in a pressure sensitive adhesive. The fiber immersed in the pressure sensitive adhesive may have different densities depending on the immersion position thereof. When fiber having different densities depending on the position of the adhesive layer is immersed, any of various elastic forces may occur for each position of the adhesive layer, and thus it is possible to rigidly protect the display module 75, and is possible to relax pressure-bonding stress during the bending of the display module 75.

In addition, the adhesive film 90 may be formed to have a film shape. For example, when the adhesive film 90 is a pressure sensitive adhesive, the pressure sensitive adhesive may be formed to have a film shape by coating both sides of fiber with a polymer resin. When the above-mentioned adhesive film 90 having a film shape is laminated on the cover window 80, which has a curvature, the cover window 80 and the adhesive film 90 may be aligned with each other, and a laminating path may be changed in the curved portion 83 of the cover window 80.

Referring to FIGS. 2, 3A, and 3B, a laminating apparatus 1 according to an embodiment may include a first frame 10 capable of supporting the cover window 80, a rotation shaft 20 extending in a first direction X, a roller portion 30 corresponding to the first frame 10, a second frame 40 capable of guiding a moving direction of the roller portion 30, a displacement sensor (e.g., a position sensor) 50 capable of sensing the displacement or position of the roller portion 30, a driver 60 capable of transmitting a driving force to the roller portion 30 and to the first frame 10, and a controller 70 capable of controlling the driving of the laminating apparatus 1.

The first frame 10 may be formed to correspond to the shape of each of the first plane 81, the second plane 82, and the curved portion 83 of the cover window 80. The cover window 80 may be fixed onto the first frame 10 through adsorption. As an example, the first frame 10 may include a first plate 11, a second plate 12, and a connection portion (e.g., a curved or bent connection portion) 13 that respectively correspond to the shape of the first plane 81, the second plane 82, and the curved portion 83 of the cover window 80, the connection portion 13 connecting the first plate 11 and the second plate 12 to each other. The first plate 11 and the second plate 12, which are supporting members capable of respectively supporting the first plane 81 and the second plane 82 of the cover window 80, may face each other at an angle α. The angle α may be adjusted to conform to an angle between the first plane 81 and the second plane 82 of the cover window 80, and may be adjusted to be equal to, or greater than, about 0 degrees, and less than about 180 degrees, for example.

The connection portion 13, which is a connection member for connecting the first plate 11 and the second plate 12 to each other, may be between the first plate 11 and the second plate 12, and may have curvature, thereby connecting the first plate 11 and the second plate 12 to each other. The curvature may conform to that of the curved portion 83 of the cover window 80. Accordingly, when the cover window 80 is supported by the first plate 11 and the second plate 12, the connection portion 13 may support the curved portion 83. In the present example, the first frame 10 is described as including only one connection portion 13, but the present invention is not limited thereto. A plurality of connection portions each having curvature may be used depending on the shape of the cover window 80.

The rotation shaft 20 is a rotation shaft member that extends in the first direction X, and the first frame 10 may be rotated about the rotation shaft 20. As an example, the first frame 10 may be rotated about the rotation shaft 20 in accordance with the moving displacement of the roller portion 30, as will be described later, and thus the first plate 11 and the second plate 12 may be alternately disposed corresponding to the roller portion 30.

The roller portion 30, which is a pressure-bonding member above the first frame 10, and which is capable of moving by applying pressure to the first plate 11 or the second plate 12, may include a central shaft 31 extending in the first direction X, and may include a roller 32 capable of rotating about the central shaft 31, as shown in FIG. 3A. As an example, when the cover window 80 and the adhesive film 90 that are on the first plate 11 are aligned with each other, the roller 32 included in the roller portion 30 moves downward along a third direction Z until contact with the adhesive film 90 is made. Thereafter, the roller portion 30 may move along a second direction Y while pressure-bonding the cover window 80 and the adhesive film 90 to each other. As described above, the first frame 10 may be rotated about the rotation shaft 20 according to the moving displacement of the roller portion 30 in the second direction Y, and thus the first plate 11 and the second plate 12 may be alternately disposed corresponding to the roller portion 30.

A plasma discharger 35 (see FIG. 2) is a cleaning device for removing adhesive foreign substances attached to the surface of the cover window 80 using plasma. As an example, carbon, which is an organic contaminant that may be attached to the surface of a contaminated cover window 80, may couple to oxygen by plasma generated from the plasma discharger 35, and may be removed into the air as $CO_2$. A general method of removing organic contaminants, and the structure of an apparatus using the method, may be accomplished by methods known in the related art, and thus, a detailed description thereof is omitted.

The plasma discharger 35 according to the present embodiment may be attached to the roller portion 30, and may move along the second direction Y together with the roller portion 30. Accordingly, the plasma discharger 35 may scan the surface of the cover window 80, and may cover the entire cover window 80, including the predetermined curved portion 83.

The second frame 40, which is a guide member capable of guiding the movement of the roller portion 30, may include first and second guide portions 41 and 42 extending along the second direction, and may include a supporting portion 43 that supports the first and second guide portions 41 and 42. As an example, the first and second guide portions 41 and 42 may be spaced from each other (e.g., spaced at a predetermined interval), and the first frame 10 may be between the first and second guide portions 41 and 42. Both ends of the roller 32 included in the roller portion 30 are moved while the roller 32 contacts upper surfaces of the first and second guide portions 41 and 42, and thus the movement of the roller portion 30 may be guided along the second direction Y. The supporting portion 43 may be between the first and second guide portions 41 and 42 to thereby support the first and second guide portions 41 and 42.

The displacement sensor 50 is a detector capable of measuring the moving displacement of the roller portion 30 in the second direction Y. As an example, when the roller portion 30 is moved in the second direction Y, and when the roller portion 30 reaches a specific position, for example, reaches a position corresponding to an end of the first plate 11, the displacement sensor 50 may transmit a displacement signal to the controller 70, as will be described later. The displacement sensor 50 may include, for example, an optical or a magnetic sensor, but the present disclosure is not limited thereto.

The driver 60 is a driving member capable of generating a driving force for moving the first frame 10 or the roller portion 30. As an example, the driver 60 may receive a driving signal from the controller 70, as will be described later, and may generate a driving force capable of rotating the first frame 10, or capable of moving the roller portion 30 in response to the driving signal. The driver 60 may include, for example, a step motor capable of generating a driving force in a stepwise manner, although the present invention is not limited thereto.

The controller 70 is a control device that is connected to the displacement sensor 50 and to the driver 60, and is configured to receive a displacement signal and to generate a driving signal. As an example, the controller 70 may transmit a driving signal to the driver 60 for generating a driving force capable of moving the roller portion 30, may receive a displacement signal corresponding to a position of the roller portion 30 from the displacement sensor 50, and may transmit a driving signal for generating a driving force capable of rotating the first frame 10 to the driver 60. The controller 70 may control not only the driver 60, but may also control the overall operation of the laminating apparatus 1. As an example, the controller 70 may be configured as one microprocessor module, or may be configured as a combination of two or more microprocessor modules. That is, the configuration of the controller 70 is not particularly limited.

FIGS. 4A to 4F are schematic perspective views illustrating a method of laminating a cover window and an adhesive film using the laminating apparatus according to an embodiment, and FIG. 5 is a flowchart illustrating a method of laminating the cover window and the adhesive film using the laminating apparatus according to the embodiment.

Figure 4A:
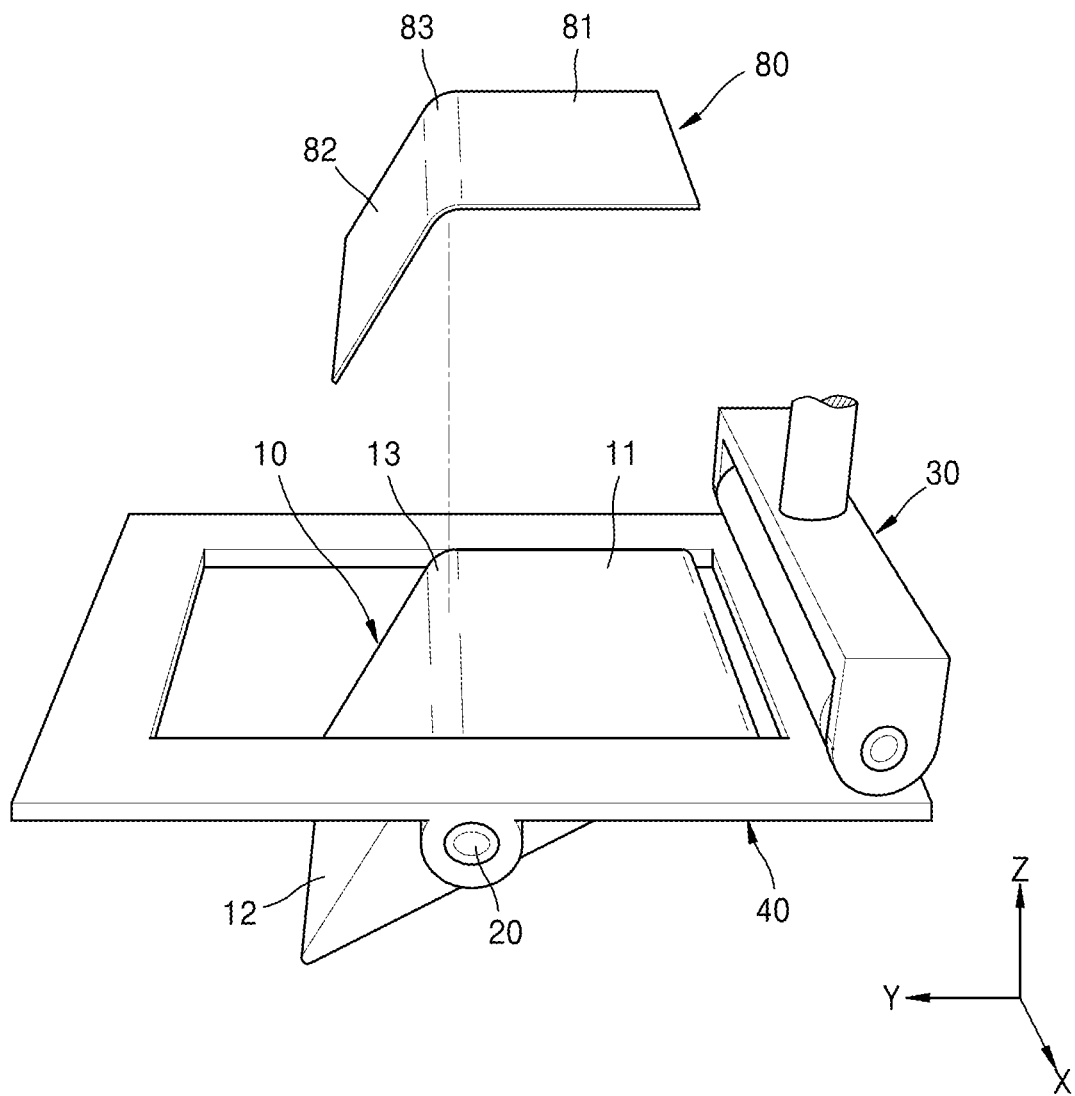
FIGS. 4A-4F are schematic perspective views illustrating a method of laminating a cover window and an adhesive film using the laminating apparatus according to an embodiment.

Referring to the drawings, first, the cover window 80 is seated on the first frame 10 (S210). As an example, as illustrated in FIG. 4A, the cover window 80 may be located between the first frame 10 and the roller portion 30. The first plane 81 and the second plane 82 of the cover window 80 may be placed to respectively correspond to the first plate 11 and the second plate 12 of the first frame 10, and the relative position of the cover window 80 to the first frame 10 may be fixed by adsorbing the cover window 80 onto the first frame 10.

Figure 4B:
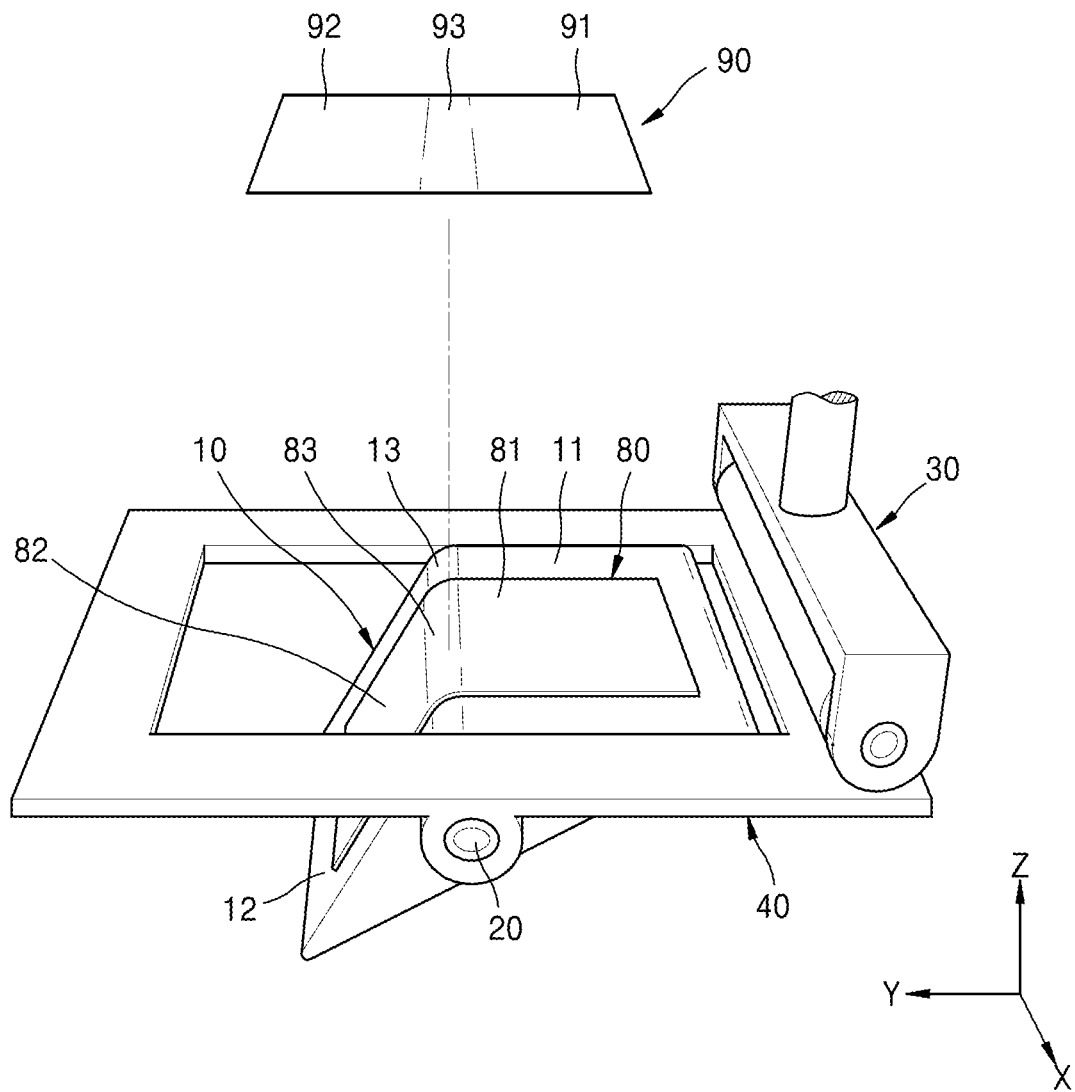

Next, a portion of the adhesive film 90 is seated/positioned on the first plate 11 (S220). As an example, as illustrated in FIG. 4B, a first portion 91 of the adhesive film 90 may be seated on the first plate 11 to correspond to the first plate 11. At this time, the adhesive film 90 may be located between the cover window 80 and the roller portion 30, and the first portion 91 of the adhesive film 90 may be situated to contact the first plane 81 of the cover window 80, which is located on the first plate 11. As described above, because the cover window 80 and the adhesive film 90 may come into contact with each other on the first plate 11, it is possible to align the cover window 80 and the adhesive film 90 with each other.

Figure 4C:
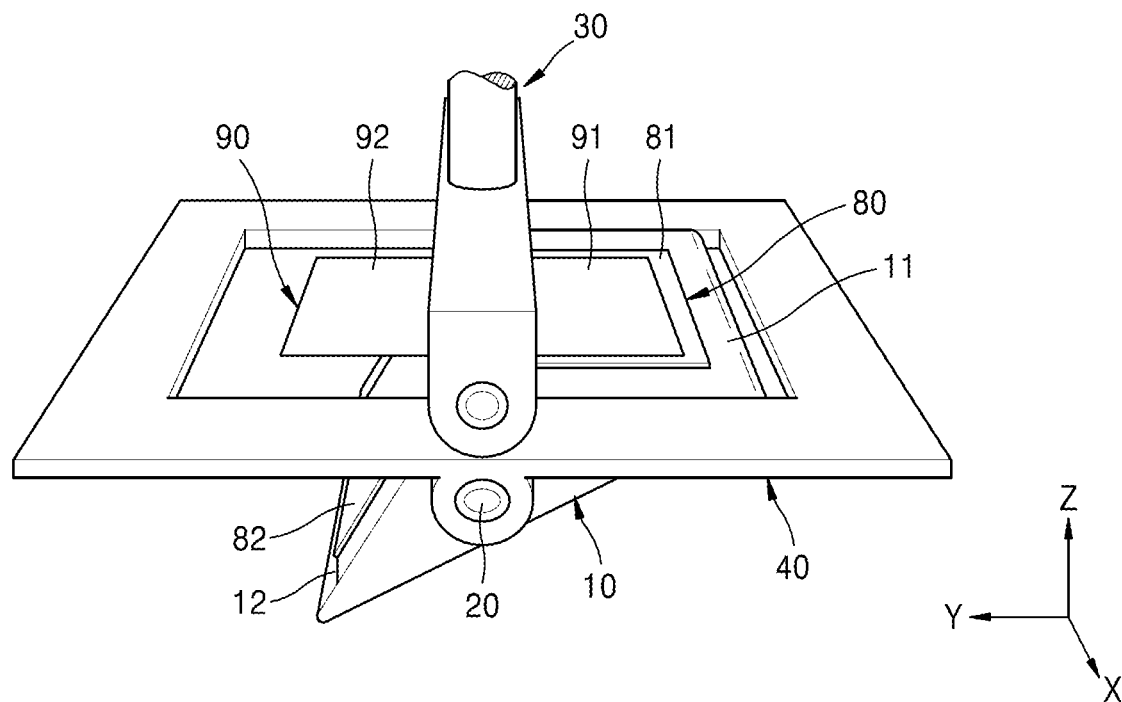

Next, the roller portion 30 is moved along the upper portion of the first plate 11 (S230). As an example, as illustrated in FIG. 4C, the roller portion 30 is moved along the upper surface of the first plate 11, that is, along the second direction Y. Accordingly, the first surface 81 of the cover window 80 and the first portion 91 of the adhesive film 90, which are located between the roller portion 30 and the first plate 11, are pressure-bonded to each other by the roller portion 30, and thus the adhesive film 90 may be laminated on the cover window 80. At this time, the movement of the roller portion 30 may be continued up to one end of the first plate 11. When the roller portion 30 faces one end of the first plate 11 (e.g., the one end of the first plate 11 adjacent the connection portion 13, or when the roller portion 30 faces, or is located above, the connection portion 13, the roller portion 30 may be stopped.

Figure 4D:
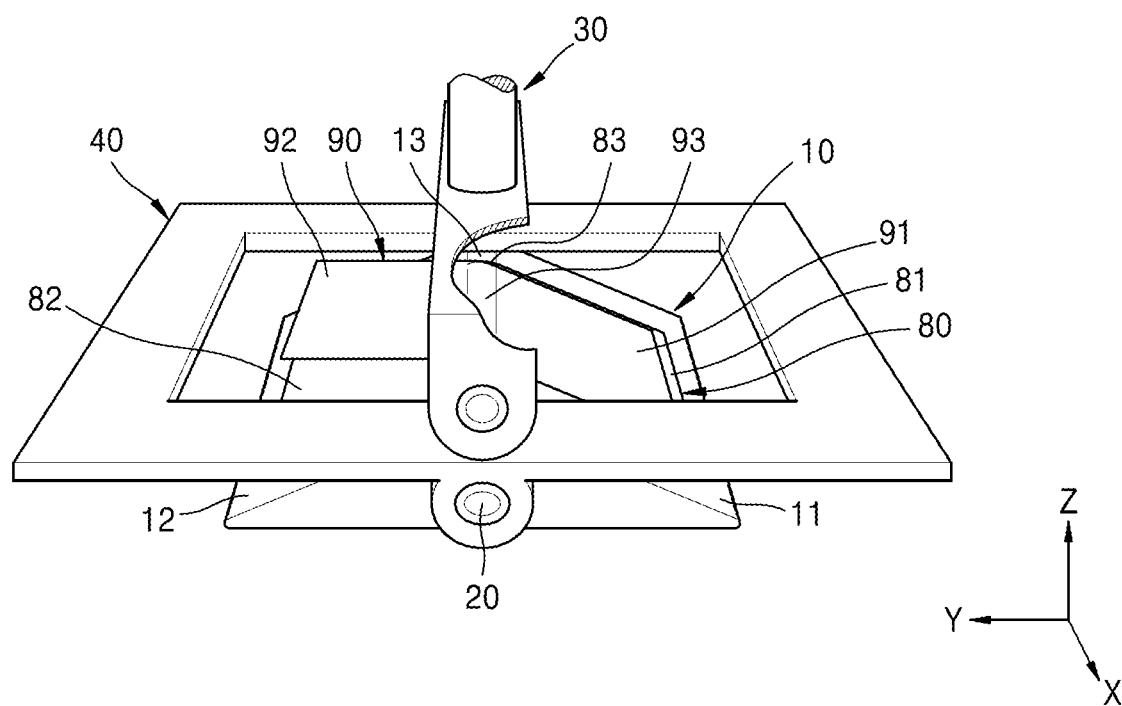
Figure 4E:
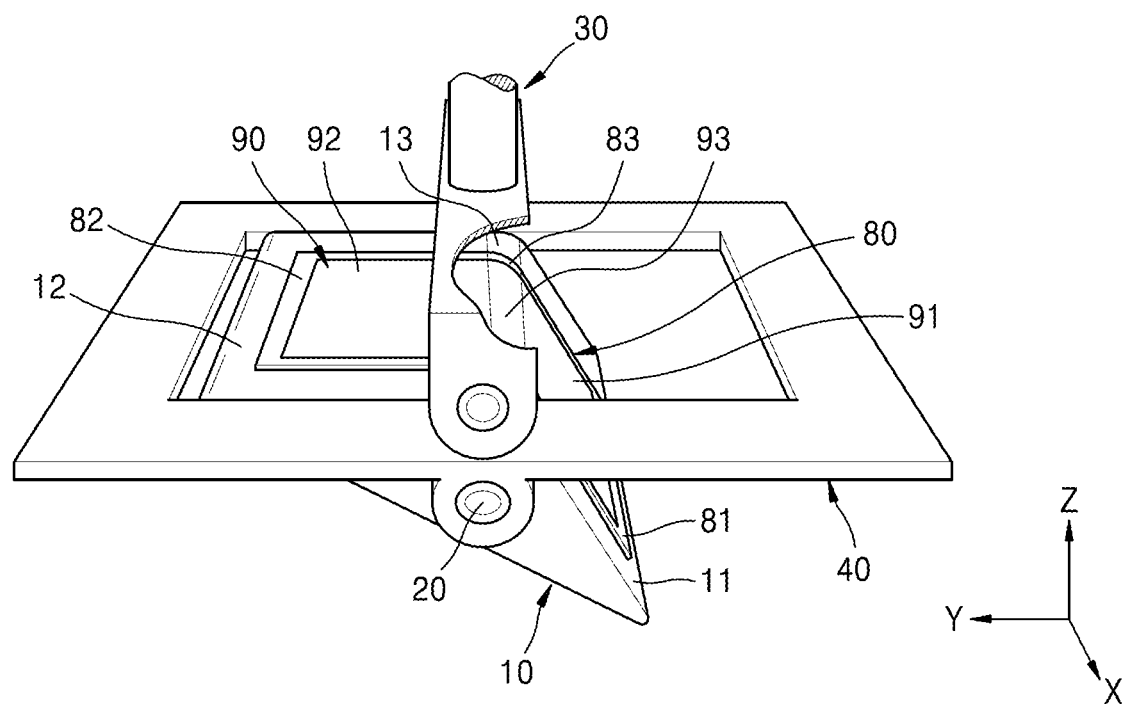

Next, the first frame 10 is rotated about the rotation shaft 20 (S240). As an example, as illustrated in FIGS. 4D and 4E, when the roller portion 30 reaches one end of the first plate 11 (e.g., the one end adjacent the connection portion 13), the first frame 10 may be rotated (e.g., rotated clockwise) about the rotation shaft 20. At this time, the roller portion 30 and the first frame 10 may maintain a pressure-bonding state therebetween. Accordingly, the curved portion 83 of the cover window 80 and the third portion 93 of the adhesive film 90, which are disposed between the roller portion 30 and the connection portion 13, are pressure-bonded to each other by the roller portion 30, and thus the adhesive film 90 may be laminated on the cover window 80. At this time, the state of the roller portion 30 being moved along the second direction Y may be maintained, and the adhesive film 90 may be laminated on the cover window 80 by the rotation of the first frame 10.

Figure 4F:
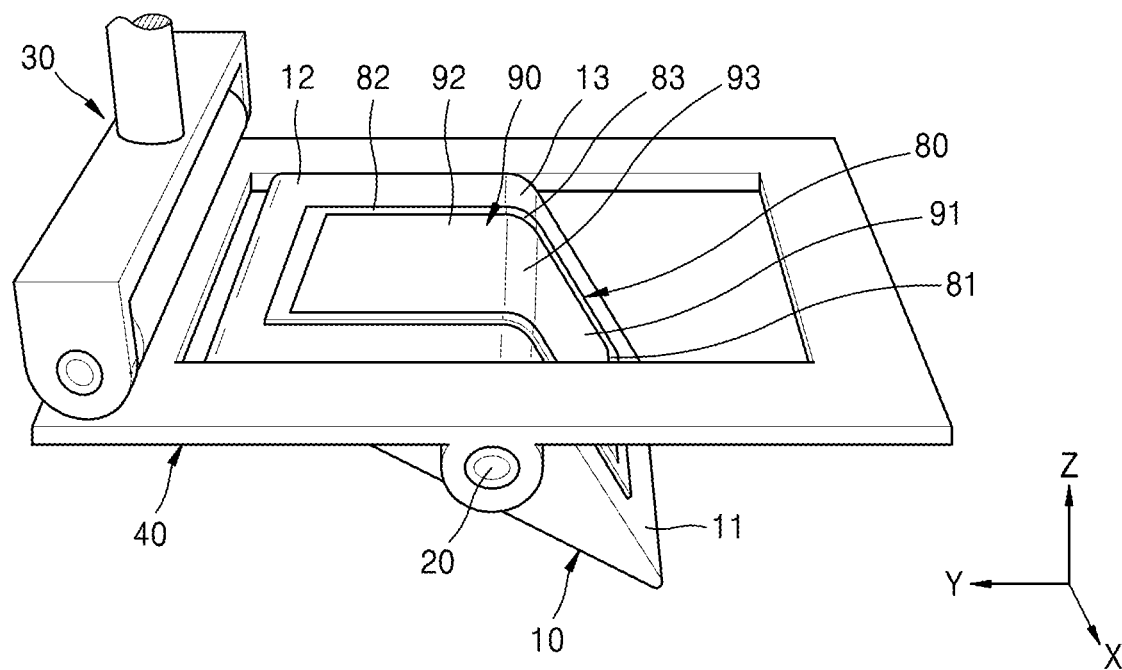

Next, the roller portion 30 is moved along the upper portion of the second plate 12 (S250). As an example, as illustrated in FIG. 4F, the roller portion 30 is moved along the upper portion of the second plate 12, that is, moved along the second direction Y. Accordingly, a second surface 82 of the cover window 80 and a second portion 92 of the adhesive film 90, which are between the roller portion 30 and the second plate 12, may be pressure-bonded to each other by the roller portion 30, and thus the adhesive film 90 may be laminated on the cover window 80. As described above, because the laminating operation is performed while the roller portion 30 is moved along the second direction Y in a linear direction, pressure applied by the roller portion 30 may be maintained constant, and thus pressure-bonding between the cover window 80 and the adhesive film 90 may be maintained constant.

Figure 6:
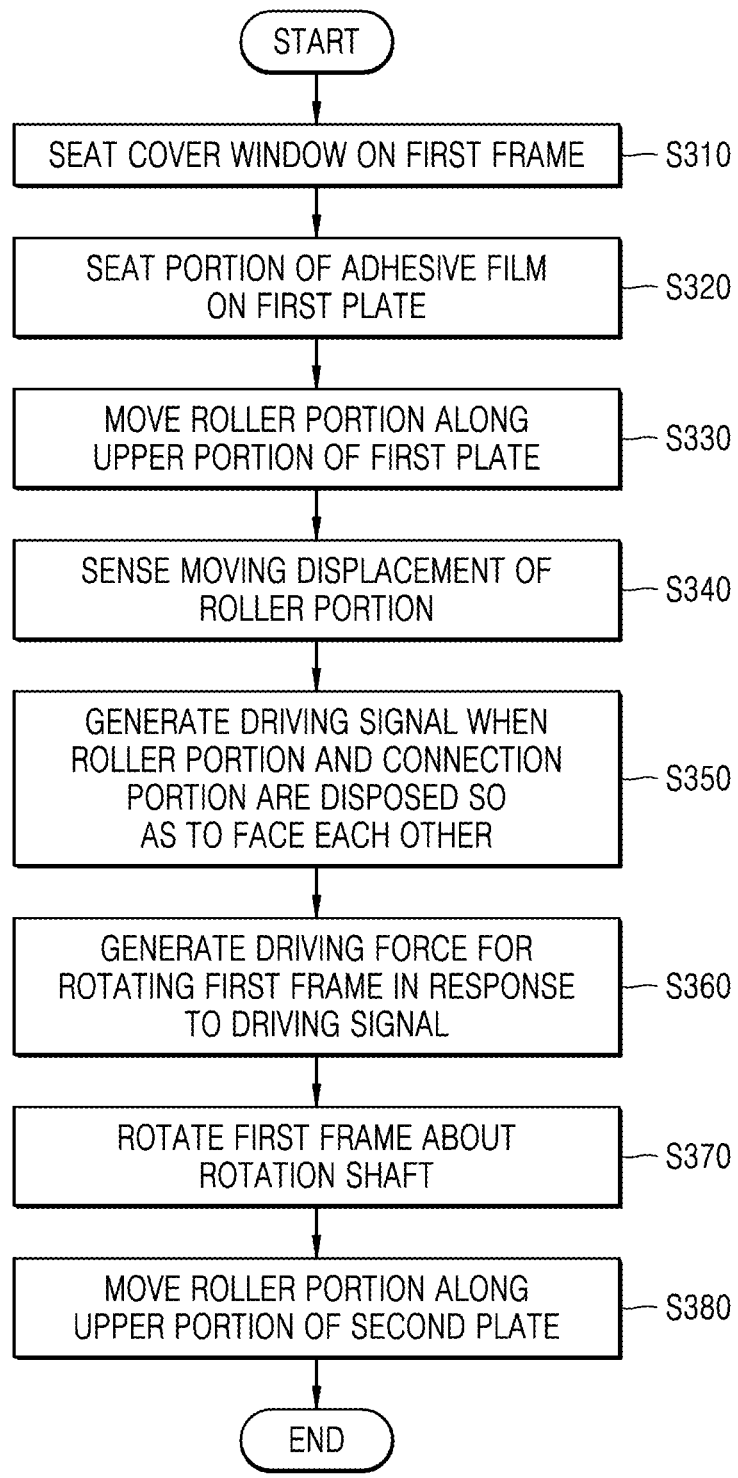
FIG. 6 is a flowchart illustrating a method of laminating a cover window and an adhesive film using a laminating apparatus according to another embodiment.

FIG. 6 is a flowchart illustrating a method of laminating a cover window and an adhesive film using a laminating apparatus according to another embodiment. Operations S310 to S330 and operations S370 and S380, which are related to the seating/positioning of a cover window 80 and an adhesive film 90, the movement of a roller portion 30, and the rotation of a first frame 10, are respectively substantially the same as operations S210 to S250 described in FIG. 5, and thus a repeated description thereof will be omitted.

Referring to FIG. 6, when the roller portion 30 is moved along the upper portion of a first plate 11, a displacement sensor 50 may sense the moving displacement of the roller portion 30 (S340). As an example, when the roller portion 30 is moved along the upper portion of the first plate 11, the displacement sensor 50 may measure the moving displacement of the roller portion 30 in a manner of tracking a moving path of the roller portion 30 in a second direction Y. However, the present disclosure is not limited thereto, and the displacement sensor 50 may be disposed at one end of the first plate 11, and may sense the roller portion 30 positioned at one end of the first plate 11, thereby measuring the moving displacement of the roller portion 30.

When the roller portion 30 and a connection portion 13 face each other, a controller 70 may generate a driving signal for rotating a first frame 10 (S350). As an example, when the roller portion 30 is positioned at one end of the first plate 11, a displacement signal may be transmitted to the controller 70 by the displacement sensor 50, and thus, the controller 70 may generate a driving signal for rotating the first frame 10.

The driver 60 may generate a driving force for rotating the first frame 10 in response to the driving signal, which is transmitted from the controller 70 (S360).

As described above, in the laminating apparatus according to the embodiments of the present disclosure, a cover window and an adhesive film may be bonded to each other on a first plate, and thus it is possible to more easily align the cover window and the adhesive film.

In addition, because a roller portion is moved in a linear direction during a laminating operation, pressure applied to the cover window and the adhesive film by the roller portion may be maintained constant, and thus pressure-bonding between the cover window and the adhesive film may be maintained constant.

Further, an angle formed between a first plate and a second plate of a first frame may be adjusted, and thus it is possible to easily adjust an angle formed between the first plane and the second plane of the cover window.

It should be understood that embodiments described herein should be considered in a descriptive sense only, and not for purposes of limitation. Descriptions of aspects within each embodiment should typically be considered as available for other similar aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. A laminating apparatus for laminating an adhesive film on a bent or curved cover window, the laminating apparatus comprising:
   a rotation shaft extending in a first direction;
   a first frame comprising:
      a first plate and a second plate facing each other at an angle therebetween; and
      a curved connection portion between the first plate and the second plate;
   a second frame coupled to the rotation shaft for guiding rotation of the first frame; and
   a roller portion above the first frame, extending in the first direction, and configured to move in a second direction that is perpendicular to the first direction by moving along the second frame at an outer periphery of the first frame while the first frame is rotated with respect to the rotation shaft according to movement of the roller portion, such that the roller portion is configured to contact an upper portion of the adhesive film above the first plate, the curved connection portion, and the second plate to thereby bond the adhesive film to the cover window.

2. The laminating apparatus of claim 1, wherein the second frame extends along the second direction, and comprises first and second guide portions spaced apart from each other,
   wherein the first frame is between the first and second guide portions, and
   wherein the first and second guide portions are configured to guide a moving direction of the roller portion.

3. The laminating apparatus of claim 1, further comprising a driver for generating a driving force for rotating the first frame about the rotation shaft.

4. The laminating apparatus of claim 3, further comprising:
   a displacement sensor configured to sense a moving displacement of the roller portion; and
   a controller configured to receive from the displacement sensor a displacement signal corresponding to the moving displacement, and configured to control driving of the driver.

5. The laminating apparatus of claim 4, wherein the controller is configured to transmit a driving signal for rotating the first frame about the rotation shaft to the driver when the roller portion faces the connection portion.

6. The laminating apparatus of claim 1, wherein the angle between the first plate and the second plate is equal to, or greater than, about 0 degrees, and less than about 180 degrees.

7. The laminating apparatus of claim 1, wherein the adhesive film comprises a pressure sensitive adhesive.

8. The laminating apparatus of claim 1, further comprising a plasma discharger attached to the roller portion.

* * * * *